June 14, 1960 W. H. CARTER, JR 2,940,360
PERFUSION CHAMBER
Filed May 23, 1957
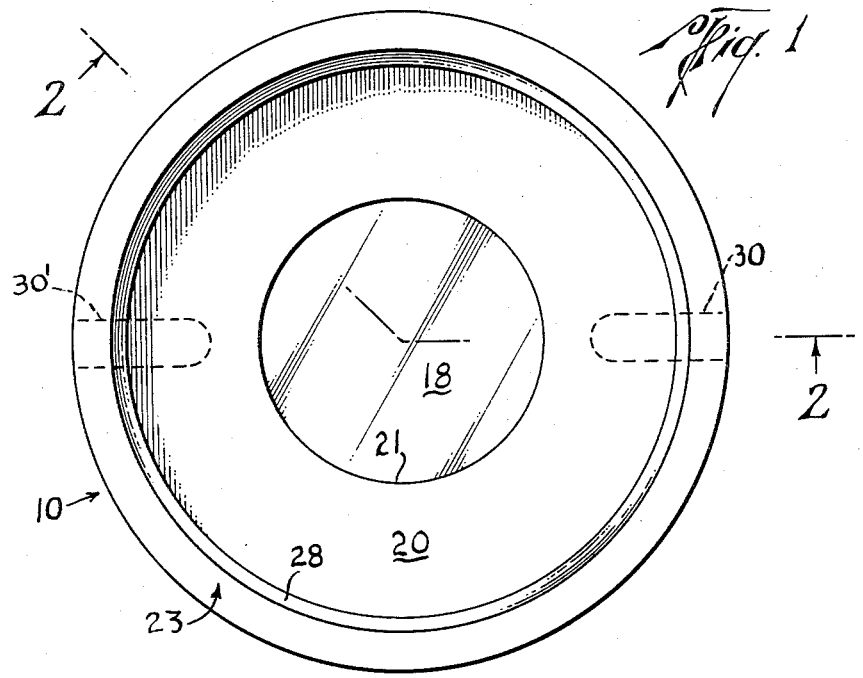
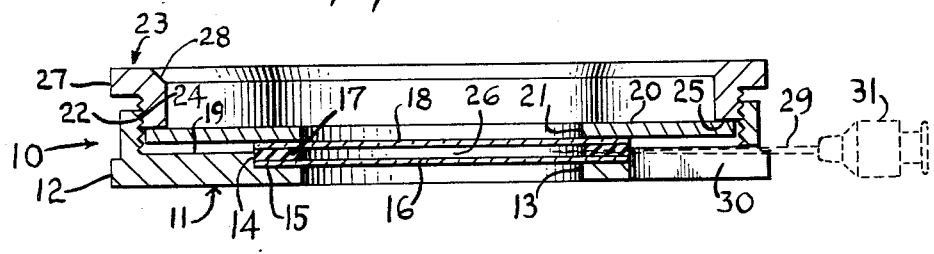
William H. Carter, Jr.
INVENTOR.
BY Wm. E. Ford
ATTORNEY

United States Patent Office 2,940,360
Patented June 14, 1960

2,940,360

PERFUSION CHAMBER

William H. Carter, Jr., % Electro-Mechanical Development Company, 2337 Bissonet, Houston, Tex.

Filed May 23, 1957, Ser. No. 661,152

2 Claims. (Cl. 88—40)

This invention relates to a chamber, as a perfusion chamber or tissue culture chamber, to be used intact with microscopes, and especially phase contrast microscopes.

The invention has as it primary object the provision of a perfusion chamber which provides an ample space for perfusion observation; which has high aseptic technical qualities; which contains adequate surface for extended cell culturing; which permits staining without disrupting the cellular growth; which permits ready and facile change over from observation of one cell structure to observation of another cell structure; and which provides a system of cell cultivation conducive to cell culture survival over long periods of time.

Another object of the invention is to provide such a tissue culture device permitting the use of hypodermic needles for the insertion of nutrients and withdrawal of products, such as waste.

It is still a further object to provide such a perfusion chamber which is constructed to exert even pressure in maintaining the slides on either side of the gasket in position without bowing.

Other and further objects will be apparent when the herein specification is considered in connection with the accompanying drawings in which:

Fig. 1 is a plan view of a form of the invention;

Fig. 2 is a sectional elevation taken along line 2—2 of Fig. 1.

Referring in detail to the drawings, a perfusion chamber 10 is shown as having a base 11, of a non-corrosive metal, such base having a rim or flange 12 thereon for ease of handling and for mounting in service. The base has a central bore 13 therein and thereabove a counterbore 14, so that an annular shoulder or ledge 15 is provided outwardly of, and around the bore 13. Outwardly of, and above the counterbore 13 the base 11 has a threaded counterbore 22, for a purpose to be hereinbelow described.

A transparent, circular bottom cover glass 16 is provided to seat on the shoulder 15 and thereabove any annular gasket 17 is supported upon the glass 16. Such gasket may be of a material which is non-toxic to the cultures to be examined and must be sufficiently penetratable to permit hypodermic needle penetration, while being of a self-sealing material so that hypodermic needles may be withdrawn therefrom without subsequent leakage through points of needle penetration. Pure gum latex has been found to have these properties, but also certain prepared leather, treated rubbers, and neoprenes may serve to this end.

A second round, transparent top cover glass is provided and fits upon and is supported by the gasket 17, and as shown in the drawings, the top of the gasket 17 extends above the inner top surface 19 of the base 11. A hold-down ring or pressure washer 20, having a bore 21 therethrough of substantially the diameter of the bore 13 through the base 11, is provided to seat upon the top cover glass 18. This washer 20 is of an outer diameter slightly less than the inner, counterbored and threaded diameter 22 provided in the base 11, so that when a top, tubular member of pressure ring 23, which is externally threaded at 24, is threaded thereinto, its inner, lower face 25 seats upon the hold-down ring or pressure washer 20 to firmly press it against the top cover glass 18, so that the gasket 17 is sealably compressed between the two cover glasses 18, 16 to provide a positively sealed chamber 26.

For purposes of handling and mounting a rim or flange 27 is provided on the pressure ring 23, and the upper, inner surface of this member is beveled at 28, also for mounting, handling, and guiding access. When the pressure ring 23 is threaded down into the base 11, it bears evenly and with even pressure on the top peripheral surface of the pressure washer 20 to force it with even pressure, and without bowing to bear upon the top cover glass 18, to thereby complete a sealed perfusion chamber 26 for enclosing therein an object to be observed through a microscope at various intervals.

Such an object may be a cell growth, as for instance, the cell growth may be cells of cancer or other disease cells. The cell is fed nutrient from time to time, as for instance it has been found that chick embryo may be best nutrient for the purpose. To this end a hypodermic needle 29, as shown in dotted lines in Fig. 2, is filled with this type of nutrient and is inserted in a slot 30 provided in the base 11, such slot extending radially inwardly a distance to give access for the needle to be inserted through the gasket 17 and into the chamber 26. The hypodermic syringe 31 may then be operated to inject the nutrient or a desired quantity thereof into the chamber 26, the needle then being withdrawn, and the gasket, by virtue of the type of material therein, contracting to sealably close the space occupied by the needle as it extended therethrough.

Another needle may be inserted through the opposite or left slot 30' and through the gasket 17 into the chamber 26 and this hypodermic may have its syringe operated to withdraw waste and/or used nutrient as it is fed into the chamber 26 by the needle to the right.

The invention differs radically from inspection devices such as disclosed in U.S. Patent No. 2,048,128, issued July 21, 1936, to J. A. Logan and designed for the purpose of providing an unsealed device through which a film of oil may be passed for visual inspection to see if the oil may be discolored. It also differs from certain tissue culture devices which have preceded it in point of time as to conception, reduction to practice, public use, and sale wherein an assembly of a top and bottom retainer plate of rectangular shape are drawn together by bolts to bear respectively upon upper and lower, transparent, rectangular cover slips to press them against a rectangular gasket having a bore therethrough to provide a sealed chamber for cell observation and nutriment.

The instant invention does not place undue stress on the top cover glass 18 because the pressure washer 20 is borne upon by the pressure ring 23 with equal pressure therearound, and the pressure washer 20, being of ample thickness to withstand bowing, transmits the hold-down force imparted thereto equally over the area of contact with the top cover plate 18, so that this plate is not bowed by such contact, nor is any bowing contact imparted through the gasket 17 to the bottom cover plate 16.

This is a distinct advantage obtained by virtue of the pressure ring 23 being threadable into the base 11 to bear with equal pressure around the pressure washer 20, whereas in the prior art tissue chambers which have preceded this invention on the market, the assembly is effected by bolts or screws connecting the four corners of outer, rectangular retaining plates 12, 14 so that the cover slides or slips thereunder are of necessity subjected to a bowing effect.

Also the provision of a round rather than a rectangular device makes it possible for perfusion chambers of this class to be mounted in receptacles equally radially spaced from the axis of a disc or drum mounting said receptacles whereby a succession of such chambers may be rotated to stopped position in front of an inspecting microscope. Especially perfusion chambers of this class have been designed to fill a rapidly growing need in the fields of tissue culture microphotography and time lapse cinemicrophotography where living specimens must be incubated, fed, or treated in such chambers while photography is in process, or where preparations must be stored for periodic observation.

The device is comprised of only six simple parts, namely the base, pressure ring, and pressure washer, or collectively the metal or outer housing parts, which may be of stainless steel or aluminum, such part not coming in contact with the preparation, and the three elements which come into contact with the preparation and which define the perfusion chamber, namely the two glass cover parts, and the gasket or sealing member therebetween, which may be of a material as rubber, silastic, and the like, it being found that where a completely non-toxic material is necessary a material such as Dow Corning Silastic, #S—9711 may best serve. Latex surgical rubber will prove adequately satisfactory in most cases whereas the silastic may be used for elevated temperatures such as 500° F. or at very low temperatures such as —200° F.

Although the chamber is of relatively small dimensions, 1¾" overall diameter x .25" overall thickness, it can be easily handled with sterile tweezers in assembly, and thereby the lower cover glass, the gasket seal, and the upper cover glass may be easily dropped into place in the upwardly facing base or main housing. Then the pressure washer may be inserted and the pressure ring screwed into place to automatically exert sufficient pressure to secure an adequate seal without danger of glass bowing or breaking.

Broadly the invention sets out to provide a sealed chamber in which the test material therein may be easily viewed for observation of various phenomena taking place in the chamber, the chamber being easily taken apart for exchange of material, and also the chamber being easily supplied, and evacuated of waste, during process of observation without the requirement of disassembly.

The invention is thus not limited to the structures shown, nor to the method of use of the hypodermic needle, but other structures and methods of access to the chamber while in assembly are considered as well, as such may fall within the broad spirit of the invention, and within the broad scope of interpretation claimed and merited by the appended claims.

What is claimed is:

1. A sealed chamber comprising in successively assembled relation from bottom to top, a base having a central bore therethrough and a counterbore concentrically outwardly of said central bore to form an upwardly facing annular shoulder in said base, a bottom glass cover to seat upon said shoulder and covering said bore, an annular gasket of substantially the outer diameter of said bottom glass cover to seat within said counterbore upon said bottom glass cover, a top glass cover to seat upon said gasket, an annular substantially rigid pressure washer above said counterbore with the central open space therein over the central portion of said top glass cover, the inner, annular portion of said pressure washer seating upon the outer, annular portion of said top glass cover and the outer annular portion of said pressure washer extending radially outwardly substantially beyond said counterbore and substantially beyond said top glass cover in direction of the outer periphery of said base, and a substantially rigid pressure ring threadably connected to said base with lower face to bear upon the outer annular top surface area of said pressure washer substantially radially outwardly of said top glass cover to exert substantially uniform pressure on the peripheral area of said pressure washer area with cantilever binding force in infinitesimally increasing force gradient, thereby being exerted by said pressure washer around the peripheral area of said top glass cover whereby to bind said top glass cover against said gasket, to bind said gasket against said lower glass cover, and to bind said lower glass cover against said shoulder and in tightly assembled relationship with said base to provide a substantially evenly confined sealed chamber space between said top and bottom glass cover and the inner surface of said gasket, and with said chamber being observable through said top and bottom glass covers respectively from above and from below.

2. A sealed chamber comprising in successively assembled relation from bottom to top, a base having a central bore therethrough and a counterbore concentrically outwardly of said central bore to form an upwardly facing annular shoulder in said base, a bottom glass cover to seat upon said shoulder and covering said bore, an annular gasket of substantially the outer diameter of said bottom glass cover to seat within said counterbore upon said bottom glass cover, a top glass cover to seat upon said gasket, an annular, substantially rigid pressure washer above said counterbore with the central open space therein over the central portion of said top glass cover, the inner, annular portion of said pressure washer seating upon the outer, annular portion of said top glass cover and the outer annular portion of said pressure washer extending radially outwardly substantially beyond said counterbore and substantially beyond said top glass cover in direction of the outer periphery of said base, and a substantially rigid pressure ring threadably connected to said base with lower face to bear upon the outer annular top surface area of said pressure washer substantially radially outwardly of said top glass cover to exert substantially uniform pressure on the peripheral area of said pressure washer area with cantilever binding force in infinitesimally increasing force gradient thereby being exerted by said pressure washer around the peripheral area of said top glass cover whereby to bind said top glass cover against said gasket, to bind said gasket against said lower glass cover, and to bind said lower glass cover against said shoulder and in tightly assembled relationship with said base to provide a substantially evenly confined sealed chamber space between said top and bottom glass cover and the inner surface of said gasket, and with said chamber being observable through said top and bottom glass covers respectively from above and from below, and opening means provided in said base and extending inwardly from the periphery of said base to the periphery of said gasket to receive means therein adapted to penetrate said gasket for access to said chamber space.

References Cited in the file of this patent

UNITED STATES PATENTS

| | | |
|---|---|---|
| 2,048,128 | Logan | July 21, 1936 |
| 2,265,182 | Mestre | Dec. 9, 1941 |
| 2,348,448 | Brewer | May 9, 1944 |
| 2,644,452 | Brown | July 7, 1953 |
| 2,690,695 | Coates | Oct. 5, 1954 |

FOREIGN PATENTS

| | | |
|---|---|---|
| 914,827 | France | July 1, 1946 |
| 936,299 | Germany | Dec. 7, 1955 |

OTHER REFERENCES

"A Separable and Multipurpose Tissue Culture Chamber," G. Rose, Texas Rep. Biol. and Med. 12 (1954): 1074–1083.

"Tissue Culture in Experimental Biology and Medicine," Journal of American Veterinary Medical Association, vol. 129, No. 10, November 15, 1956, pages 458–462. Pages 459 and 462 relied on.